United States Patent

Kawazu et al.

[11] Patent Number: 5,876,854
[45] Date of Patent: Mar. 2, 1999

[54] UV ABSORBING, COLORED FILM-COVERED GLASS ARTICLES

[75] Inventors: Mitsuhiro Kawazu; Taro Miyauchi; Koichi Maeda; Tatsuya Noguchi, all of Osaka, Japan

[73] Assignee: Nippon Sheet Glass Co., Ltd., Japan

[21] Appl. No.: 817,601

[22] PCT Filed: Dec. 24, 1996

[86] PCT No.: PCT/JP96/03759
§ 371 Date: Apr. 18, 1997
§ 102(e) Date: Apr. 18, 1997

[87] PCT Pub. No.: WO97/23424
PCT Pub. Date: Jul. 3, 1997

[30] Foreign Application Priority Data

Dec. 26, 1995 [JP] Japan .................................. 338993/95

[51] Int. Cl.[6] .................................................. B32B 17/00
[52] U.S. Cl. .......................... 428/428; 428/432; 428/433; 428/434; 428/446; 428/448; 428/698; 428/701; 428/702; 359/359; 359/361
[58] Field of Search .................. 428/328, 432, 428/433, 434, 446, 448, 698, 701, 702; 359/359, 361

[56] References Cited

U.S. PATENT DOCUMENTS 5,480,722  1/1996  Tomonaga ............................... 428/428

FOREIGN PATENT DOCUMENTS 6135746  5/1994  Japan .
6191895  7/1994  Japan .
6191896  7/1994  Japan .

Primary Examiner—Timothy M. Speer
Attorney, Agent, or Firm—Lorusso & Loud

[57] ABSTRACT

UV absorbing, colored film-covered glass articles comprising covering, on a surface of a glass substrate, a UV absorbing, colored film which comprises, as main components expressed by wt %, 5~50 of silicon oxide, 5~70 of titanium oxide, 20~80 of cerium oxide, 5~30 of coloring fine particles of at least one member selected from the group consisting of gold, silver, platinum, palladium, cadmium sulfide and cadmium selenide, and 0~30 of at least one coloring metal oxide selected from the group consisting of cobalt oxide, chromium oxide, copper oxide, manganese oxide, nickel oxide and iron oxide.

The UV absorbing, colored film-covered glass articles can be arbitrarily controlled with respect to the color tone, the UV transmittance, and the visible light transmittance.

13 Claims, 2 Drawing Sheets

UV ABSORBING, COLORED FILM-COVERED GLASS ARTICLES

TECHNICAL FIELD

This invention relates to glass articles covered with a UV absorbing, colored film and more particularly, to glass plates covered with a UV absorbing, colored film, which plates are particularly suitable for use as windows of vehicles such as automobiles and buildings.

TECHNICAL BACKGROUND

The methods of making colored glass include (1) an ion-exchange method wherein inorganic salts of silver or copper are applied onto a glass surface and calcined, so that the ultrafine particles of the inorganic salt of silver or copper are allowed to penetrate into the glass substrate, thereby causing a transparent colloidal color development, and (2) a method wherein gold ions are mixed with a metal alkoxide solution and applied onto a substrate, followed by thermal treatment to deposit fine particles of the gold. Besides, (3) there is also known a method wherein a metallic film is vacuum deposited on a glass substrate by use of sputtering techniques.

On the other hand, the methods of forming a UV absorbing film on a glass substrate include a method wherein metal oxides serving as a UV absorbing component, e.g. zinc oxide, titanium oxide, cerium oxide and the like, are formed on a glass substrate according to a sol-gel technique or a sputtering technique thereby forming a UV absorbing film on the substrate. For instance, Japanese Laid-open Patent Application No. 6-192598 sets out a method wherein an UV absorbing film which contains $CeO_2:TiO_2:SiO_2$ at ratios by weight of 64:18:18 is formed on a glass substrate by a sol-gel technique.

The films formed on glass substrates according to the above-mentioned methods are those which are colored but have no capability of UV absorption, or those which have the capability of UV absorption but are not colored. In Japanese Laid-open Patent Application No. 6-192598. there is described a glass article covered with a colored film which comprises fine particles of silicon oxide, titanium oxide and gold, and has a preferred composition comprising, for example, 85~3 wt % of $TiO_2$, 40~0 wt % of $SiO_2$ and 5~60 wt % of Au. However, this colored film-covered glass article is not satisfactory with respect to the UV cutting-off or screening performance when the content of $TiO_2$ is not great. If the content of $TiO_2$ is increased, a high UV screening performance is obtained and the film assumes a blue to pink color. Nevertheless, it is not possible to arbitrarily control the color of transmitted light, a UV transmittance and a visible light transmittance.

DISCLOSURE OF THE INVENTION

The problem of the invention resides in the provision of UV absorbing, colored film-covered glass articles which are able to arbitrarily control the color tone, and UV and visible light transmittances.

In order to solve the above problem, we developed UV absorbing, colored film-covered glass articles which have a good color developing function and a high UV screening rate and which can arbitrarily control a visible light transmittance.

More particularly, the present invention provides a UV absorbing, colored film-covered glass article which comprises a glass substrate covered with a UV absorbing, colored film which comprises, as main components and by % on the weight basis, silicon oxide 5~50, titanium oxide 5~70, cerium oxide 20~80, coloring fine particles of at least one member selected from the group consisting of gold, silver, platinum, palladium, cadmium sulfide and cadmium selenide 5~30, and at least one coloring metal oxide selected from the group consisting of cobalt oxide, chromium oxide, copper oxide, manganese oxide, nickel oxide, and iron oxide 0~30

The respective components in the composition of the UV absorbing, colored film of the invention are described below.

Silicon oxide is necessary for maintaining the film strength. If the content is too low, the film strength lowers along with too high a visible light reflectance. On the contrary, when the content is too great, the film transparency undesirably lowers along with the lowing of UV absorption power. Accordingly, the content of silicon oxide should range 5~50 wt %, preferably 30~50 wt % and more preferably 15~40 wt %, on calculation as $SiO_2$.

Titanium oxide is necessary for the formation of a film containing silicon oxide and cerium oxide. If the content is too low, the film-forming property and the transparency lower along with the lowering of UV absorption power. On the contrary, if the content is too much, the film-forming property lowers and the visible light reflectance becomes too high. Accordingly, the content of titanium oxide is in the range of 5~70 wt %, preferably 5~45 wt % and more preferably 15~45 wt % on calculation as $TiO_2$.

Cerium oxide is a component necessary for absorbing UV light. If the content is too low, the UV absorption power lowers along with the lowing of a film-forming property. In contrast, when the content is too high, the transparency of the resulting film lowers. Accordingly, the content of cerium oxide is in the range of 20~80 wt %, preferably 20~60 wt % and more preferably 30~60 wt %, when calculated as $CeO_2$.

The coloring fine particles of at least one member selected from the group consisting of gold, silver, platinum, palladium, cadmium sulfide and cadmium selenide are necessary for obtaining a light or bright color. If the content of the particles is too low, satisfactory coloration cannot be expected. On the other hand, when the content is too much, the durability of the resulting film lowers. Accordingly, the content of the fine particles for coloration (or the total content when plural types of members are used) is in the range of 5~30 wt %, preferably 10~20 wt %. Among these coloring fine particles, a mixture of those particles of gold and palladium is preferred because it is chemically stable and is readily, inexpensively available.

At least one coloring metal oxide selected from the group consisting of cobalt oxide, chromium oxide, copper oxide, manganese oxide, nickel oxide and iron oxide exhibits a dark color when used singly. The color tone can be appropriately controlled by co-existence with the coloring fine particles to provide a favorable color tone. Additionally, the coloring metal oxide is able to have the visible light transmittance arbitrarily controlled in the range of 20%~80%. When the content is too high, the visible light reflectance of the resultant film becomes too great, with the attendant disadvantage that the visible light transmittance undesirably becomes less than 20%. Accordingly, the content of the coloring metal oxide (or the total amount when plural types of metal oxides are used) is in the range of 0~30 wt %, preferably 0~18.0 wt %, and more preferably 0.2~10.0 wt %, when calculated as CoO, CrO, CuO, MnO, NiO and $Fe_2O_3$.

When the thickness of the UV absorbing, colored film is too small, the UV absorption power lowers and a desired color cannot be obtained. On the contrary, when the thickness is too great, the film strength lowers. Thus, the film has preferably a thickness of 30~200 nm, more preferably 45~150 nm. The UV absorbing, colored film should has a refractive index of 1.63~2.20.

A glass plate having the UV absorbing, colored film is attached to as a window of an automobile in such a way that the covered surface of the glass plate is at the inner side of the automobile. In this condition, if the visible light reflectance is too high as viewed from the inside of the automobile, there is the great possibility that the visual range of a driver may be impeded. Accordingly, when visible light is transmitted from the side of the covered surface of the glass plate, the reflectance of the light should preferably be as small as possible within a range of about 20% or below, more preferably 10% or below, and most preferably 8% or below. If the visible light reflectance of the glass plate as viewed from the outside of automobile is too high, the appearance becomes glittered. When visible light is transmitted from the side opposite to the covered surface of the glass plate, the reflectance of the light should preferably be as small as possible within a range of about 20% or below, preferably 10% or below and most preferably 8% or below. From the standpoint of an appearance, the color of the reflected light should preferably be close to neutral gray, and its value (color saturation) of $(a^2+b^2)^{1/2}$ calculated from the values of a and b of the Lab color system should preferably be 10 or below, more preferably 5.0 or below, and most preferably 2.0 or below.

In the practice of the invention, an intermediate layer containing silicon oxide and having a refractive index lower than the refractive index of the UV absorbing film may be formed between the UV absorbing, colored film and the glass substrate. More particularly, the intermediate layer comprises 20~100 wt %, preferably 30~90 wt %, of silicon oxide calculated as $SiO_2$, 0~70 wt %, preferably 20~65 wt %, of at least one metal oxide selected from the group consisting of titanium oxide, zirconium oxide, cerium oxide, zinc oxide and tantalum oxide (provided that the amount is a total amount of oxides when plural types of oxides are used) calculated as $TiO_2$, $ZrO_2$, $CeO_2$, ZnO and $Ta_2O_5$, respectively, and 0~30 wt %, preferably 5~20 wt %, of coloring fine particles of at least one member selected from the group consisting of gold, silver, platinum, palladium, cadmium sulfide and cadmium selenide (provided that the amount is a total amount when plural types of members are used).

The intermediate layer is so controlled in composition by adding, if necessary, titanium oxide or other metal oxides and coloring fine particles to silicon oxide such that the refractive index of the intermediate layer ranges 1.45~2.05 and is lower by at least 0.10, preferably by at least 0.2, than the refractive index of the UV absorbing film. By appropriately controlling the refractive index and the thickness of the intermediate layer having such a low refractive index, the reflectance of visible light can be made low and the reflected light color can be controlled favorably as having a color close to neutral gray. The intermediate layer should preferably has a refractive index intermediate between the refractive index of the UV absorption film and the refractive index of the substrate glass (usually 1.51~1.52 with the case of a soda-lime silicate glass). In order that the reflectance of visible light is lowered and the reflection of near infrared light is enhanced, the values of $n_2$ and t should preferably be so selected as to satisfy the following equations (1) and (2)

$$(n_1 \cdot n_2)^{1/2} + (n_1 - n_3)/4 \geq n_2 \geq (n_1 \cdot n_3)^{1/2} - (n_1 - n_3)/4 \quad (1)$$

$$t = \lambda/4n_2 \quad (2)$$

wherein $n_1$ represents a refractive index of the UV absorption film, $n_2$ and t, respectively, represent a refractive index and a film thickness (nm) of the intermediate layer, $n_3$ represents a refractive index of the substrate glass, and $\lambda$ represents a light wavelength ranging 400~700 nm.

Instead of the formation of the intermediate layer containing silicon oxide, a layer having the same composition as the intermediate layer (i.e. a low refractive index uppermost layer) may be formed on the UV absorbing, colored film to lower the reflectance of visible light. Additionally, the reflected color can be preferably so controlled as to come near to neutral gray.

The refractive index of the low refractive index uppermost layer should preferably satisfy the conditions wherein in order to render the reflected color of the UV absorption glass neutral and to reduce the reflectance of visible light, the reflected light at the interface between the air and the low refractive index uppermost layer and the reflected light at the interface between the low refractive index uppermost layer and the UV absorption film are offset.

More particularly, when the refractive index of the low refractive index uppermost layer is taken as $n_4$, the refractive index of the UV absorption film is taken as $n_1$, and the refractive index of air is taken as $n_3$, the complete non-reflective condition of the refractive indices should be expressed by the equation, $n_4 = (n_1 \times n_3)^{1/2}$. Since $n_3 = 1$, the complete non-reflective condition becomes $n_4 = n_1^{1/2}$. If the refractive index, $n_2$ of the low refractive index uppermost layer is slightly outside the range of the equation, the anti-reflective effect becomes great. Accordingly, $n_4$ should preferably be within a range of 90~110% of the root square of the refractive index of the UV absorption film, or should preferably satisfy the equation (3)

$$1.10 \times n_1^{1/2} \geq n_4 \geq 0.90 \times n_1^{1/2} \quad (3)$$

More preferably, $n_4$ is in the range of 95~105%. The refractive index of the UV absorption film should preferably be 1.8 or above in order to ensure the non-reflective condition relative to the low refractive index uppermost layer.

Another condition is such that after calcination, the low refractive index uppermost layer should have a film thickness, t, which is an optical film thickness of a ¼ wavelength of visible light having a wavelength, $\lambda$, ranging 400~700 nm. In practice, the thickness should preferably be within a range of +10%~−10% of the above-defined thickness. More particularly, the following equation (4) should be satisfied $$1.1 \times \lambda/(4n_4) \geq t \geq 0.9 \times \lambda/(4n_4) \quad (4)$$

More preferably, the film thickness is in the range of 0.95~1.05 times the ¼ wavelength of visible light having a wavelength of 500~600 nm.

The fine particles for coloration are able to develop a color which depends on the refractive index of the matrix. A higher refractive index of the matrix leads to the development of a color closer to blue. On the contrary, when the refractive index of the matrix becomes lower, a color closer to pink results. Where the coloring fine particles and, particularly, those fine particles as used in the UV absorption film are contained in the intermediate layer or in the low refractive index uppermost layer, the coloring fine particles in the intermediate layer (or the low refractive index uppermost layer) assumes a color different from those fine particles in the UV absorption film which has a refractive index different from that of the intermediate layer (or the low refractive index uppermost layer). As a whole, the resultant transmitted light exhibits a mixed color.

Where a glass plate having such a double-layered structure is attached to as a window for automobiles, the reflectance of visible light from the covered surface side of the glass plate or from the glass side should preferably be as small as possible within a range of about 20% or below. The reflected color from the side opposite to the covered surface of the glass plate (i.e. the glass surface side) should preferably be close to neutral gray and should preferably have a value (saturation) of 10 or below, more preferably 5.0 or below and most preferably 2.0 or below, as expressed in terms of $(a^2+b^2)^{1/2}$ calculated from the values of a and b in the Lab color system.

When expressed by the Lab color system, the UV absorbing, colored film-covered glass articles of the invention should preferably have a color tone within a region defined by a sector which is formed by connecting point O' (a=0, b=0), point A' (a=25, b=0), point B' (a=0, b=−25), point C' (a=0, b=25) and O' in this order in such a way that points O' and A' and points C' and O' are, respectively, connected linearly and points A' and B' and points B' and C' are, respectively, connected arcuately about point O'. More preferably, when expressed by the Lab color system, the glass articles should have a color tone of transmitted light within a region defined by a sector which is formed by connecting point O (a=0, b=0), point A (a=20, b=−6), point B (a=0, b=−20.9), point C (a=−6, b =20)), and point O in this order in such a way that points O and A and points C and O are, respectively, connected linearly, and points A and B, and points B and C are, respectively, connected arcuately about point O.

When a 1.5~5.5 mm thick transparent glass substrate colored in green is used as the glass substrate in the present invention, a UV-screening glass plate having a transmitted light color close to neutral gray is obtained.

The transmitted light color developed by the coloring fine particles in the UV absorbing, colored film changes depending on the refractive index of a matrix. The refractive index of the film is controlled to be in the range of 1.65~1.76 and the film composition should be so selected to comprise, as main components, silicon oxide 30~50,
titanium oxide 5~45,
cerium oxide 20~60 provided that the total of titanium oxide and cesium oxide is in the range of 35~55. and
coloring fine particles of gold 5~30

When the green color glass substrate is used in combination with a glass plate whose transmitted light has a chromaticity of a value of a of −10.0~−4.0 and a value of b of −1.0~4.0 as expressed by the Lab color system, there can be obtained a colored film-covered glass plate which has a transmitted light color tone close to neutral gray, especially as having transmitted light whose color tone is within a range of a of −5.0~5.0 and a value of b of −5.0~5.0 and whose lightness, L, is within a range of 60~90 when expressed by the Lab color system.

The UV absorbing, colored film having a refractive index of 1.65~1.76 assumes a reddish purple~purple color. When this color is combined with a green color of a glass substrate which is in complementary relation therewith, there is obtained a colored film-covered glass plate whose color is close to neutral gray. However, if the UV absorbing, colored film has a refractive index higher than 1.76, the color of the film becomes blue. The combination of the colored film with a green color glass substrate, there cannot be obtained any color close to neutral gray, but a color closer to bluish green.

In the foregoing, there has been set out the case where the coloring fine particles are contained in the UV absorbing, colored film. When an intermediate layer having a low refractive index is provided between the UV absorbing, colored film and a glass substrate or when a layer having the same composition as the intermediate layer (called a low refractive index uppermost layer) is formed on the UV absorbing, colored film, the coloring fine particles may be contained in the intermediate layer (or in the low refractive index uppermost layer), not in the UV absorbing, colored film.

According to the second embodiment of the invention, there is provided a glass article which comprises, on the surface of a glass substrate, a UV absorbing, colored film comprising, as main components expressed by wt %, silicon oxide 5~50,
titanium oxide 5~70, and
cerium oxide 20~80, and an intermediate layer between the UV absorbing, colored film and the glass substrate, or a low refractive index uppermost layer formed on the UV absorbing, colored film, each comprising, as expressed by wt %, fine particles for coloration of at least one member selected from the group consisting of gold, silver, platinum, palladium, cadmium sulfide and cadmium selenide 5~30,
silicon oxide 5~95,
at least one metal oxide selected from the group consisting of titanium oxide, zirconium oxide, cerium oxide, zinc oxide and tantalum oxide (total amount when plural oxides are used) 0~70, and
at least one metal oxide for coloration selected from the group consisting of cobalt oxide, chromium oxide, copper oxide, manganese oxide, nickel oxide and iron oxide (total amount when plural oxides are used) 0~30
whereby the glass article has a covered UV absorbing, colored film formed with an intermediate layer (or a low refractive index uppermost layer) having a refractive index lower than the refractive index of the UV absorbing, colored film.

In the intermediate layer (or the low refractive index uppermost layer), there is further added, aside from the colloidal fine particles for coloration and silicon oxide, at least one metal oxide selected from the group consisting of cobalt oxide, chromium oxide, copper oxide, manganese oxide, nickel oxide and iron oxide, by which the color of the transmitted light can be appropriately controlled and the transmittance of visible light can be arbitrarily controlled within a range of 20%18 80%.

The coloring metal oxide is present in the intermediate layer (or in the low refractive index uppermost layer) in an amount of 0~30%, preferably 0~18.0 wt % and most preferably 0.2~10.0 wt %. If the content is less than 0.2 wt %, the effect of the coloration and the effect of lowering the visible light transmittance are not shown. On the contrary, when the content exceeds 30 wt %, the visible light transmittance becomes less than 20%, with the attendant disadvantage that the color is rarely observed.

The intermediate layer (or the low refractive index uppermost layer) may further comprise, aside from the coloring fine particles, silicon oxide and at least one metal oxide for coloration selected from the group consisting of cobalt oxide, chromium oxide, copper oxide, manganese oxide, nickel oxide and iron oxide, at least one metal oxide for coloration selected from the group consisting of titanium oxide, zirconium oxide, cerium oxide, zinc oxide and tantalum oxide. By this, the UV absorbing power is enhanced and the visible light transmittance can be arbitrarily controlled within a range of 20%~80%.

When plural metal oxides are incorporated in the intermediate layer as the at least one metal oxide selected from the group consisting of cobalt oxide, chromium oxide, copper oxide, manganese oxide, nickel oxide and iron oxide, the total amount is in the range of 0~70 wt %, preferably 5~70 wt %. If the content is less than 5 wt %, the UV absorption power does not increase. On the contrary, when the content exceeds 70 wt %, the film strength inconveniently lowers.

In the practice of the invention, when the refractive index of the film is changed by changing the type and amount of colloidal fine particles for coloration, or by changing content of ratio of silicon oxide, titanium oxide or cerium oxide, various types of transmitted light colors including red, blue and yellow colors can be realized. When at least one oxide selected from the group consisting of Co, Cr, Cu, Mn, Ni and Fe is further contained, the visible light transmittance can be arbitrarily controlled within a range of approximately 20%~80%. Moreover, when a low refractive index layer is used as an undercoat or an uppermost layer to provide a double-layer structure, the reflectance can be lowered and the reflected light color can be appropriately controlled.

Among the coloring fine particles in the present invention, the fine particles of silver, platinum and palladium are suitably obtained from starting materials including chlorides or nitrates such as chloroauric acid, silver nitrate, palladium chloride and the like. However, no limitation is placed provided that salts are stable and soluble. Starting materials for the fine particles of cadmium sulfide and cadmium selenide include cadmium acetate, cadmium nitrate, cadmium chloride, $SeC(NH_2)$ and the like.

The UV absorbing, colored film containing the coloring fine particles of the invention is obtained by coating, onto a substrate, a solution which comprises a compound capable of forming colored fine particles, silicon oxide, titanium oxide, and cerium oxide and, if necessary, a catalyst, additives and an organic solvent, and drying and calcining the coating. Cadmium sulfide can be formed by sulfidation treatment during the course of the calcination.

The starting materials for the silicon oxide, titanium oxide and cerium oxide used to form the colored film of the invention may be any ones which are capable of forming a transparent film according to a sol-gel method and are particularly described below.

The starting materials for silicon oxide should preferably be metal alkoxides including, for example, tetramethoxysilane, tetraethoxysilane, tetrapropoxysilane, tetrabutoxysilane and the like. Moreover, condensates of these alkoxides ($n \geq 2$), and mixtures of the condensates are also preferably used. Examples of the condensates include hexaethoxydisiloxane (n=2), octaethoxytrisiloxane (n=3), decaethoxytetrasiloxane (n=4), ethoxypolysiloxane ($n \geq 5$) and the like. Ethyl silicate 40 which consists of a monomer (n=1) and a condensate (n>2) is favorably used [the composition of the silicate 40 is set out in the report of J. Cihlar, Colloids and Surfaces A: Physicochem. Eng. Aspects 70 (1993), pp. 253 to 268, and comprises, on the weight basis, 12.8 wt % of a monomer (n=1), 10.2 wt % of a dimer (n=2), 12.0 wt % of a timer (n=3), 7.0 wt % of a tetramer (n=4), 56.2 wt % of a polymer ($n \geq 5$), and 1.8 wt % of ethanol].

Further, alkyltrialkoxysilanes wherein the alkoxy group of the above-mentioned compounds are replaced by an alkyl group may also be used. For instance, mention is made of those compounds wherein the alkoxy group is substituted with a linear or branched alkyl group such as a methyl group, an ethyl group, a propyl group, a butyl group, a 2-ethylbutyl group, an octyl group or the like, a cycloalkyl group such as a cyclopentyl group, a cyclohexyl group or the like, an alkenyl group such as a vinyl group, an allyl group, a γ-methacryloxypropyl group, a γ-acryloxypropyl group or the like, an aryl group such as a phenyl group, a toluyl group, a xylyl group or the like, an aralkyl group such as a benzyl group, a phenethyl group or the like, or a γ-mercaptopropyl group, a γ-chloropropyl group, γ-aminopropyl group or the like.

The starting materials for titanium oxide include organotitanium compounds such as titanium alkoxides, titanium acetylacetonates, titanium carboxylates and the like. Examples of the titanium alkoxides are usually represented by the formula, $Ti(OR)_4$ (wherein R represents an alkyl group having up to 4 carbon atoms). In view of the reactivity, titanium isopropoxide and titanium butoxide are preferred. With titanium compounds, it is known that acetylacetonates are preferred from the standpoint of stability. The acetylacetonates are represented by the general formula, $Ti(OR)mLn$ (m+n=4 and n≠0) wherein L represents acetylacetone. Titanium alkoxides may be converted to an acetylacetonate compound by means of acetylacetone. Alternatively, commercially available titanium acetylacetonate may be used. In addition, carboxylates may also be used.

The starting materials for cerium oxide preferably include organocerium compounds such as cerium alkoxides, cerium acetylacetonates and cerium carboxylates. Besides, cerium inorganic compounds may also be used such as nitrates, chlorides, sulfates and the like. In view of the stability and the ease in availability, cerium nitrates and cerium acetylacetonates are preferred.

Where the starting materials for silicon oxide, titanium oxide and cerium oxide used are alkoxides, catalysts for hydrolysis are used including inorganic acids such as hydrochloric acid, nitric acid, sulfuric acid and the like, and organic acids such as acetic acid, oxalic acid, formic acid, propionic acid, p-tolenesulfonic acid and the like.

The starting materials for the oxides of Co, Cr, Cu, Mn, Ni and Fe which are added to the UV absorbing, colored film, aside from the coloring fine particles, silicon oxide, titanium oxide and cerium oxide, preferably include inorganic compounds such as nitrates, chlorides and the like, organic acids such as acetic acid, propionic acid, butanoic acid, acrylic acid, methacrylic acid, stearic acid and the like, and organoamines modified with alkanolamines.

The coating solution used to cover the UV absorbing, colored film is obtained by dissolving the respective starting materials in solvents therefor and mixing the solutions at predetermined ratios.

The organic solvent used in the practice of the invention depend on the film formation method. For instance, the organic solvent used for a gravure coating method, a flexographic printing method and a roll coating method should preferably be ones whose evaporation rate is low. The reason why the solvent whose evaporation rate is low is preferred is that where if a solvent which has a high evaporation rate is used, it is evaporated prior to satisfactory leveling. The evaporation rate of a solvent is generally evaluated by a relative evaporation rate index in the where the rate of butyl acetate is taken as 100. Solvents having a value of 40 or below are classified as a solvent which has a "very low" evaporation rate. Such a solvent is preferred for use in gravure coating, flexographic printing and roll coating methods. For instance, mention is made of ethyl cellosolve (ethylene glycol monoethyl ether), butyl cellosolve (ethylene glycol monobutyl ether), cellosolve acetate (ethylene glycol monoethyl ether acetate), carbitol (diethylene glycol monoethyl ether), hexylene glycol, diethylene glycol, tripropylene glycol, diacetone alcohol, tetrahydrofurfuryl alcohol and the like. The solvents for the coating solution used in the present invention should preferably contain at least one solvent of the type mentioned above. In order to control the viscosity and surface tension of the coating solution, a plurality of the above-mentioned solvents may be used. Solvents whose evaporation rate is so high that a relative evaporation rate exceeds 100 and which include, for example, methanol (610), ethanol (340), n-propanol (110), isopropanol (300) and the like may be added to solvents of the above-mentioned type which have a relative evaporation rate index of 40 or below.

The coating methods used in the invention are not critical and include, for example, a spin coating method, a dip coating method, a spray coating method, a printing method. Printing methods such as a gravure coating method, a flexographic printing method, a roll coating method, a screen printing method are high in productivity and in use efficiency of a coating composition and, thus, are preferred.

The coating solution for the UV absorbing, colored film is applied onto a glass substrate according to the above-mentioned coating method and is thermally treated in an oxidative atmosphere, or in an atmosphere of sulfur if the coating solution is used to form a film containing fine particles of cadmium sulfide, at a temperature of 100° C.~400° C. for 5~200 minutes, thereby permitting coloring fine particles to be deposited. Further, the resulting layer is calcined at a temperature of 500°~700° C. or over for 10 seconds ~5 minutes to form a 60~200 nm thick, UV absorbing, colored film.

If a double-layer coating is formed, a first layer is applied and thermally dried, on which a second layer is applied and thermally dried, followed by repeating the above procedure.

A glass plate on which the coating solution has been applied and dried and, if necessary, a coating solution for a second layer has been subsequently applied and dried, is subjected to masking, if necessary. Thereafter, where it is desired that the glass plate is further bent and/or subjected to thermal tempering, the film calcination may be performed in the bending and/or thermal tempering step without resorting to any specific step of the film calcination.

Among the starting materials for the silicon oxide, titanium oxide, zirconium oxide, cerium oxide, zinc oxide and tantalum oxide used in the intermediate layer (or the low refractive index uppermost layer), titanium oxide and cerium oxide may be those used as the starting materials for the UV absorbing, colored film. The starting materials for zirconium, oxide, zinc oxide and tantalum oxide are described.

The starting materials for zirconium oxide preferably include zirconium methoxide, zirconium tetraethoxide, zirconium tetraisopropoxide, zirconium tetra-n-propoxide, zirconium tetraisopropoxide-isopropanol complex, zirconium tetra-iso-butoxide, zirconium tetra-n-butoxide, zirconium tetra-sec-butoxide, zirconium tetra-t-butoxide and the like. Moreover, there may be used alkoxides of zirconium halides such as zirconium monochloride trialkoxides, zirconium dichloride dialkoxides and the like wherein the alkoxy group of the compound represented by the general formula (4) is replaced by a halogen. Alternatively, there may be used salts of zirconium alkoxides and organic acids wherein at least one alkoxy group of the zirconium alkoxides is replaced by an organic acid such as acetic acid, propionic acid, butanoic acid, acrylic acid, methacrylic acid, stearic acid or the like.

The starting materials for zinc oxide should preferably include dispersions of fine particles of zinc oxide in organic solvents, salts of organic acids and zinc such as zinc acetylacetonate and zinc ethylhexanoate, organozinc compounds modified with alkanolamines.

The starting materials for tantalum oxide preferably include tantalum alkoxides and organotantalum compounds.

The type and mixing ratio of at least one starting material of titanium, cerium, tantalum, zirconium and silicon should preferably be determined while taking into account the miscibility with solvents, coloring fine particles and transition metal compounds and the stability, the refractive index, the color and the reflected light color in an optical aspect, and the abrasion resistance and the chemical durability in a mechanical aspect.

The glass substrate used in the practice of the invention includes tempered glass plates, non-tempered glass plates, laminated glass plates, plural-layered glass plates and the like which have a colorless or colored transparent soda lime silicate glass composition. Preferably, a heat ray-interrupting colored glass plate for a window of automobiles is used. The glass plate has a chromaticity of transmitted light expressed by a value of a of $-10.0~2.0$ and a value of b of $-4.0~4.0$ of the Lab color system, more preferably a chromaticity expressed by a value of a of $-10.0~-4.0$ and a value of b of $-1.0~4.0$, is colored in light green, has a UV transmittance of 10~70% at a wavelength of 370 nm, a visible light transmittance of 40~85%, a sunlight transmittance of 20~80%, and has a thickness of 1.5~5.5 mm. A typical preferred composition of the glass plate comprises, by wt %, 72.4 of $SiO_2$, 0.13 of $Al_2O_3$, 0.558 of $Fe_2O_3$ (total iron), 0.135 of FeO, 8.77 of CaO, 3.84 of MgO, and 13.8 of $Na_2O$.

As the glass substrate, there is preferably used a 1.5 mm~5.5 mm thick glass plate for automobiles which has a UV transmittance (T370 nm) at a wavelength of 370 nm of 10~70%, more preferably a UV transmittance (Tuv) determined by ISO 9050 (a value calculated by multiplying transmittances at intervals of 5 nm in the range of 377.5 nm~297.5 nm by predetermined coefficients of weighing function and adding the resultant products) of 15% or below, has a visible light transmittance of 40~85%, more preferably 70~85%, and has a sunlight transmittance (solar radiation transmittance) of 20~80%, more preferably 40~65%. When such a glass substrate is coated, there is obtained a colored glass having high UV absorption power.

In the practice of the invention, when US light is screened by combination of the coloration with metallic fine particles and the use of a UV absorber, the coloration, the visible light transmittance and the UV transmittance can be arbitrarily controlled, thereby obtaining a UV-screened, colored glass having a sunlight transmittance of 55% or below and a UV transmittance at a wavelength of 370 nm of 55% or below, more preferably 45% or below, and most preferably a UV transmittance (Tuv) of 12% or below. Moreover, a double-layered coating enables one to realize the appropriate control of the reflectance by utilizing the interference of the film arrangement and a fine color adjustment.

As having set out hereinabove, when the concentrations of colloidal fine particles for coloration and other coloring materials and the concentrations of cerium oxide, titanium oxide and silicon oxide are changed, the UV absorbing, colored glass of the invention can be arbitrarily controlled with respect to the visible light transmittance, the color transmitted light, the color of reflected light, and the UV screening rate.

EMBODIMENTS

Figure 1:
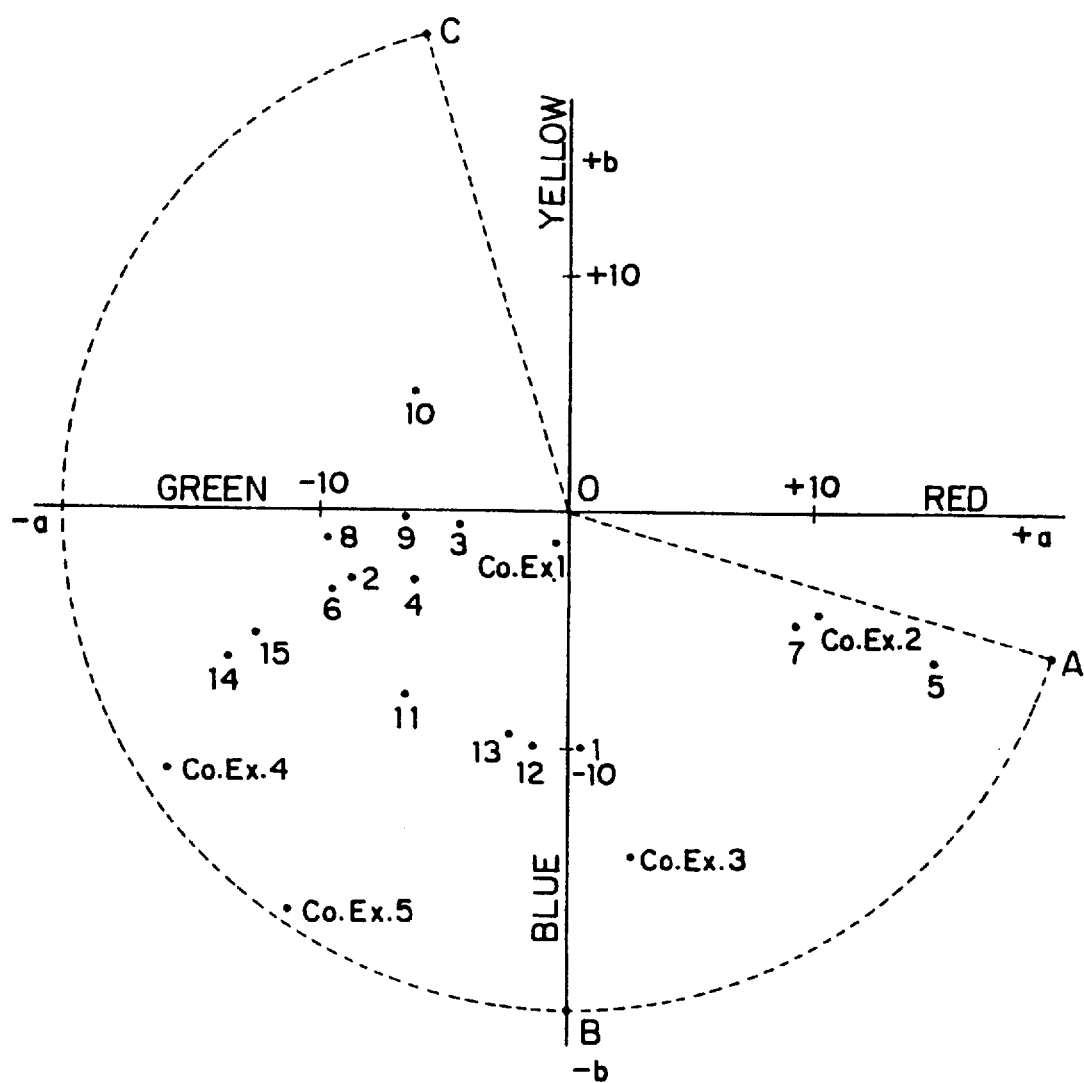
FIG. 1 is a graph showing the color tones of transmitted light of examples of the invention and comparative examples.

The invention is described in more detail by way of examples.

[Example 1]

3 moles of acetylacetone was added to 1 mole of cerium nitrate hexahydrate, followed by treatment by heating to 90° C. with agitation for 1 hour. The resultant solution was provided as a stock solution for cerium nitrate. This contained 23.2% of $CeO_2$ as solids.

2 moles of acetylacetone was dropped through a dropping funnel into 1 mole of titanium isopropoxide being agitated. The solution was provided as a stock solution of titanium oxide. This had a $TiO_2$ solid content of 16.5%.

6 g of 0.1N hydrochloric acid and 44 g of ethyl cellosolve were added to 50 g of ethyl silicate ("Ethyl Silicate 40" available from Colcoat Co., Ltd.), followed by agitation at room temperature for 2 hours. The resultant solution was provided as a stock solution for silicon oxide. This had a $SiO_2$ solid content of 20%. Chloroauric acid tetrahydrate was dissolved in ethyl cellosolve to make a concentration of 15%.

1.11 g of the cerium nitrate stock solution, 0.732 g of the titanium oxide stock solution and 0.605 g of the silicon oxide stock solution were, respectively, weighed, to which 6.22 g of ethyl cellosolve was added. Finally, the ethyl cellosolve solution of the chloroauric acid tetrahydrate was added to the mixture in an amount of 1.33 g and mixed under agitation to obtain Coating Solution 1.

The thus prepared coating solution was spin coated onto a colorless, transparent glass substrate at a frequency of 1000 rpm/10 seconds. After drying in air, it was thermally treated at 250° C. for 2 hours to permit gold fine particles to be deposited, followed by calcination at 720° C. for 120 seconds, thereby obtaining a glass plate bearing a colored film thereon. The colored film had a visible light transmittance, a sunlight transmittance, a color (transmitted light), and a UV transmittance at a wavelength of 370 nm (hereinafter referred to as 370 nm UV transmittance) shown in Tables 1~3. The thus obtained colored film exhibited good results with respect to the chemical resistance and the Taber abrasion resistance. The reflected light color was neutral in tone (a value of saturation expressed by $(a^2+b^2)^{1/2}$ of 10 or below). It will be noted that the reflection characteristic is a value which is determined by passing light from a side (a glass surface side) opposite to the covered film on the glass substrate.

[Example 2]

From the stock solutions prepared in Example 1, 1.12 g of the cerium nitrate stock solution, 1.05 g of the titanium oxide stock solution and 0.25 g of the silicon oxide stock solution were weighed, to which 6.20 g of ethyl cellosolve wad added, followed by final addition of 1.33 g of the ethyl cellosolve solution of chloroauric acid tetrahydrate and mixing under agitation to obtain a coating solution.

The thus prepared coating solution was applied onto, dried in air and thermally treated in the same manner as in Example 1 to obtain a coated glass plate, with its characteristics shown in Table 1~3. The resultant colored film exhibited good results with respect to the chemical resistance and the Taber abrasion resistance. The color of the reflected light obtained was neutral in tone.

[Example 3]

Ethyl cellosolve was added to 15 g of cobalt chloride hexahydrate to make 100 g of a solution in total. The resultant solution consisted of a 15% cobalt chloride hexahydrate solution.

From the stock solutions prepared in Example 1, 0.68 g of the cerium nitrate stock solution, 0.68 g of the titanium oxide stock solution, and 0.12 g of the silicon oxide stock solution were, respectively, weighed, and 2.0 g of the 15% cobalt chloride hexahydrate solution was weighed, to which 5.19 g of ethyl cellosolve was added. Finally, 1.33 g of the ethyl cellosolve solution of chloroauric acid tetrahydrate was added to the mixture and mixed under agitation to obtain Coating Solution 3.

The thus prepared coating solution 3 was applied onto, dried and thermally treated in the same manner as in Example 1 to obtain a covered glass plate with its characteristics shown in Table 1~3. The resultant colored film exhibited good results with respect to the chemical resistance and the Taber abrasion resistance. The color of the reflected light obtained was neutral in tone.

[Example 4]

Ethyl cellosolve was added to 15 g of chromium chloride hexahydrate to make 100 g of a solution in total. The solution consisted of a 15% chromium chloride hexahydrate solution.

From the stock solutions prepared in Example 1, 0.68 g of the cerium nitrate stock solution, 0.68 g of the titanium oxide stock solution, and 0.12 g of the silicon oxide stock solution were, respectively, weighed, and 2.0 g of the 15% chromium chloride hexahydrate solution was weighed, to which 5.19 g of ethyl cellosolve was added, followed by further addition of 1.33 g of the ethyl cellosolve solution of the chloroauric acid tetrahydrate and mixing under agitation to obtain Coating Solution 4.

The thus prepared coating solution 4 was applied onto, dried and thermally treated in the same manner as in Example 1 to obtain a covered glass plate with its characteristics shown in Table 1~3. The resultant colored film exhibited good results with respect to the chemical resistance and the Taber abrasion resistance. The color of the reflected light obtained was neutral in tone.

[Example 5]

As a coating solution for a first layer, 2.5 g of the silica stock solution was weighed from the stock solutions of Example 1, to which 5.50 g of ethyl cellosolve was added, followed by final addition of 2.00 g of the ethyl cellosolve solution of 10 wt % of chloroauric acid tetrahydrate to which 3-aminopropyltriethoxysilane had been added in an equimolar amount relative to the chloroauric acid and mixing under agitation to obtain Coating Solution 5. As a coating solution for a second layer, the coating solution used in Example 1 was used as Coating Solution 6.

The coating solution 5 was spin coated onto a colorless, transparent glass substrate at 1000 rpm/10 seconds. After drying in air, the coating was thermally treated at 250° C. for 2 hours to form an intermediate film. Thereafter, the coating solution 6 was similarly formed on the intermediate layer. Further, calcination was performed at 720° C. for 120 seconds to obtain a glass substrate bearing a colored film thereon. The characteristics of the colored film are shown in Tables 1~3. The colored film exhibited good results with respect to the chemical resistance and the Taber abrasion resistance. The color of the reflected light was neutral in tone.

[Example 6]

260.28 g of ethyl acetylacetate was added to 388.68 g of zirconium tetrabutoxide and agitated for 2 hours. The resultant solution was provided as a zirconium stock solution and had a $ZrO_2$ solid content of 17.8%.

As a coating solution for a first layer, 1.5 g of the silica stock solution was weighed from the stock solution of Example 1, to which 7.38 g of ethyl cellosolve was added, followed by final addition of 1.10 g of the zirconium stock solution and mixing under agitation to provide Coating Solution 7. As a coating solution for a second layer, 1.14 g of the cerium nitrate stock solution, 1.13 g of the titanium oxide stock solution and 0.20 g of the silicon oxide stock solution were taken out from the stock solutions prepared in Example 1, to which 6.20 g of ethyl cellosolve was added, followed by final addition of 1.33 g of the ethyl cellosolve solution of chloroauric acid tetrahydrate and mixing under agitation to obtain Coating Solution 8.

Using the coating solutions 7 and 8 in place of the coating solutions 5 and 6 of Example 5, these solutions were applied onto, dried in air and thermally treated in the same manner as in Example 5 to obtain a glass plate, with its characteristics shown in Tables 1~3. The resulting colored film exhibited good results with respect to the chemical resistance and the Taber abrasion resistance. The color of the reflected light was neutral in tone.

[Example 7]

As a coating solution for a first layer, the coating solution 5 used as the first layer of Example 5 was provided, and as a coating solution for a second layer, Coating Solution 9 was prepared by weighing 1.14 g of the cerium nitrate stock solution, 1.13 g of the titanium stock solution and 0.20 g of the silicon oxide stock solution from the stock solutions prepared in Example 1, adding 7.53 g of ethyl cellosolve to the mixture and mixing under agitation.

In the same manner as in Example 5 using the coating solutions 5 and 9 in placed of the coating solutions 5 and 6 in Example 5, a glass plate was obtained by application, drying in air and thermal treatment, with its characteristics shown in Tables 1~3. The resulting colored film exhibited good results with respect to the chemical resistance and the Taber abrasion resistance. The color of the reflected light was neutral in tone.

[Example 8]

In the same manner as in Example 5 using the coating solution 7 used in Example 6 and the coating solution 3 used in Example 3 in place of the coating solutions 5 and 6 in Example 5, respectively, the application, drying in air and thermal treatment were performed to obtain a glass plate, with its characteristics shown in Tables 1~3. The resulting colored film exhibited good results with respect to the chemical resistance and the Taber abrasion resistance. The color of the reflected light was neutral in tone.

[Example 9]

In the same manner as in Example 5 using the coating solution 7 used in Example 6 and the coating solution 4 used in Example 4 in place of the coating solutions 5 and 6 in Example 5, respectively, the application, drying in air and thermal treatment were performed to obtain a glass plate, with its characteristics shown in Tables 1~3. The thickness and the refractive index of the intermediate layer did not satisfy the equations (1) and (2) indicated hereinbefore. It will be noted that the optical thickness was equal to a quarter wavelength of light having a wavelength of 660 nm.

[Example 10]

1.13 g of the cerium nitrate stock solution, 1.13 g of the titanium oxide stock solution and 0.2 g of the silicon oxide stock solution were weighed from the stock solutions prepared in Example 1, to which 7.54 g of ethyl cellosolve was added and mixed under agitation to provide Coating Solution 10.

In the same manner as in Example 5 using the coating solution 3 used in Example 3 and the above coating solution 10 in place of the coating solutions 5 and 6 in Example 5, respectively, the application, drying in air and thermal treatment were performed to obtain a glass plate, with its characteristics shown in Tables 1~3. The resulting colored film exhibited good results with respect to the chemical resistance and the Taber abrasion resistance.

[Example 11]

1.79 g of the cerium nitrate stock solution, 0.254 g of the titanium oxide stock solution and 0.21 g of the silicon oxide stock solution were weighed from the stock solutions prepared in Example 1, to which 6.42 g of ethyl cellosolve was added, followed by final addition of 1.33 g of the ethyl cellosolve solution of chloroauric acid tetrahydrate and mixing under agitation to obtain a coating solution.

The thus obtained coating solution was applied onto, dried in air and thermally treated in the same manner as in Example 1 to obtain a glass plate, with its characteristics shown in Tables 1~3. The resulting colored film exhibited good results with respect to the chemical resistance and the Taber abrasion resistance.

[Example 12]

1.378 g of the cerium nitrate stock solution, 0.546 g of the titanium oxide stock solution and 0.452 g of the silicon oxide stock solution were, respectively, weighed from the stock solutions prepared before, to which 6.29 g of ethyl cellosolve was added, followed by final addition of 1.33 g of the ethyl cellosolve solution of chloroauric acid tetrahydrate and mixing under agitation to obtain a coating solution.

The thus obtained coating solution was applied onto, dried in air and thermally treated in the same manner as in Example 1 to obtain a glass plate, with its characteristics shown in Tables 1~3. The resulting colored film exhibited good results with respect to the chemical resistance and the Taber abrasion resistance. The color of reflected light was neutral in tone.

[Example 13]

1.596 g of the cerium nitrate stock solution, 0.395 g of the titanium oxide stock solution and 0.327 g of the silicon oxide stock solution were, respectively, weighed from the stock solutions prepared before, to which 6.35 g of ethyl cellosolve was added, followed by final addition of 1.33 g of the ethyl cellosolve solution of chloroauric acid tetrahydrate and mixing under agitation to obtain a coating solution.

The thus obtained coating solution was applied onto, dried in air and thermally treated in the same manner as in Example 1 to obtain a glass plate, with its characteristics shown in Tables 1~3. The resulting colored film exhibited good results with respect to the chemical resistance and the Taber abrasion resistance. The color of reflected light was neutral in tone.

[Example 14]

As a glass substrate, there was used a 3.4 mm thick green glass substrate (glass composition: $SiO_2$=71.0, $Al_2O_3$=1.53, $Fe_2O_3$=0.52, CaO=8.62, MgO=4.06, $Na_2O$=12.3, and $K_2O$=0.76; refractive index=1.51; luminous transmittance Y=81.2%; sunlight transmittance Tg=60.9%; visible light transmittance Rg=7.1%; UV transmittance (T370 nm)=62.5%; UV transmittance (Tuv)=31.4%; saturation of transmitted light L=91; and saturation of reflected light a=−1.3, b=−0.2). Such a coating solution as used in Example 2 was provided and spin coated onto the green glass substrate at 1000 rpm/10 seconds. After drying in air, the coating was thermally treated at 250° C. for 2 hours to permit fine particles of gold to be deposited. Subsequently, it was maintained in an electric furnace at 720° C. for 120 seconds and press molded. Immediately after the press molding, the glass was tempered by air-cooling to obtain a bent, tempered glass plate for automobiles. The bend shape was as desired and any through-view strain was observed. The characteristics of the resultant colored film are shown in Tables 1~3.

The colored film was good with respect to the chemical resistance and the Taber abrasion resistance.

[Example 15]

In the same manner as in Example 6 using the same coating solution as in Example 6 but using the same green glass substrate as used in Example 14, the application, drying in air and thermal treatment were performed to obtain a glass plate, with its characteristics shown in Tables 1~3. The resulting colored ad good results with respect to the chemical resistance and the Taber on resistance. The color of reflected light was neutral in tone.

TABLE 1

| Example | Film | Film Composition (wt %) | | | | | | |
|---|---|---|---|---|---|---|---|---|
| | | $SiO_2$ | $TiO_2$ | $CeO_2$ | Au | CoO | CrO | $ZrO_2$ |
| 1 | UV absorption film | 20.2 | 20.2 | 43.6 | 16.0 | — | — | — |
| 2 | " | 6.0 | 30.7 | 46.4 | 16.0 | — | — | — |
| 3 | " | 6.3 | 27.8 | 41.9 | 23.5 | 0.5 | — | — |
| 4 | " | 6.3 | 27.8 | 41.9 | 23.5 | — | 0.4 | — |
| 5 | " | 20.2 | 20.2 | 43.6 | 16.0 | — | — | — |
| 5 | intermediate layer | 84.0 | — | — | 16.0 | — | — | — |
| 6 | UV absorption film | 6.0 | 30.7 | 46.4 | 16.0 | — | — | — |
| 6 | intermediate layer | 39.4 | — | — | — | — | — | 60.6 |
| 7 | UV absorption film | 8.2 | 36.6 | 55.2 | — | — | — | — |
| 7 | intermediate layer | 84.0 | — | — | 16.0 | — | — | — |
| 8 | UV absorption film | 6.3 | 27.8 | 41.9 | 23.5 | 0.5 | — | — |
| 8 | intermediate layer | 39.4 | — | — | — | — | — | 60.6 |
| 9 | UV absorption film | 6.3 | 27.8 | 41.9 | 23.5 | — | 0.4 | — |
| 9 | intermediate layer | 39.4 | — | — | — | — | — | 60.6 |
| 10 | UV absorption film | 8.2 | 36.6 | 55.2 | — | — | — | — |
| 10 | intermediate layer | 6.3 | 27.8 | 41.9 | 23.5 | 0.5 | — | — |
| 11 | UV absorption film | 7.9 | 7.9 | 68.2 | 16.0 | — | — | — |
| 12 | " | 15.1 | 15.0 | 53.9 | 16.0 | — | — | — |
| 13 | " | 10.9 | 10.8 | 62.3 | 16.0 | — | — | — |
| 14 | " | 6.0 | 30.7 | 46.4 | 16.0 | — | — | — |
| 15 | " | 6.0 | 30.7 | 46.4 | 16.0 | — | — | — |
| 15 | intermediate layer | 39.4 | — | — | — | — | — | 60.6 |

TABLE 2

| | UV Absorption Film | | Intermediate Layer | |
|---|---|---|---|---|
| Example | Thickness (nm) | Refractive Index | Thickness (nm) | Refractive Index |
| 1 | 130 | 1.9 | — | — |
| 2 | 120 | 2.0 | — | — |
| 3 | 90 | 2.0 | — | — |
| 4 | 90 | 2.0 | — | — |
| 5 | 130 | 1.9 | 120 | 1.5 |
| 6 | 120 | 2.0 | 100 | 1.65 |
| 7 | 130 | 2.0 | 120 | 1.5 |
| 8 | 90 | 2.0 | 110 | 1.7 |
| 9 | 90 | 2.0 | 100 | 1.65 |
| 10 | 130 | 2.0 | 90 | 2.0 |
| 11 | 70 | 2.1 | — | — |
| 12 | 120 | 1.9 | — | — |
| 13 | 120 | 2.0 | — | — |
| 14 | 120 | 2.0 | — | — |
| 15 | 120 | 2.0 | 100 | 1.65 |

TABLE 3

| Example | Ya (%) | Ta (%) | Transmitted light color | Chromaticity of transmitted light (a/b) | Visible light reflectance (glass surface side) (%) | Chromaticity of reflected light (glass surface side) | 370 nm transmittance (%) |
|---|---|---|---|---|---|---|---|
| 1 | 55.2 | 63.8 | dark blue | 0.37/−10.13 | 12.07 | 3.98/7.13 | 45.2 |
| 2 | 68.0 | 65.5 | greenish blue | −8.95/−2.85 | 13.22 | 3.35/−3.95 | 45.6 |
| 3 | 65.9 | 66.4 | dark green | −4.53/−0.64 | 16.18 | −0.50/1.18 | 47.5 |
| 4 | 59.5 | 66.4 | dark green | −6.22/−3.09 | 20.43 | 1.76/−0.40 | 44.8 |
| 5 | 61.6 | 62.7 | reddish purple | 15.08/−6.27 | 12.55 | −2.61/3.56 | 41.2 |
| 6 | 68.0 | 65.5 | bluish green | −9.55/−3.30 | 13.22 | 3.62/−4.16 | 43.1 |
| 7 | 63.3 | 68.7 | pink | 9.52/−4.85 | 13.55 | −0.60/2.23 | 50.1 |
| 8 | 65.6 | 64.7 | light bluish | −9.65/−1.29 | 14.24 | 7.29/−2.86 | 46.7 |
| 9 | 72.6 | 74.8 | green | −6.72/−0.22 | 6.67 | 10.72/−3.09 | 44.7 |
| 10 | 62.7 | 63.7 | light bluish | −6.26/4.93 | 13.49 | −0.95/−13.25 | 27.8 |
| 11 | 60.2 | 65.7 | green | −6.53/−7.93 | 6.75 | 1.07/0.97 | 45.8 |
| 12 | 65.0 | 54.4 | light bluish | −1.20/−10.00 | 13.69 | 5.57/0.84 | 51.5 |
| 13 | 66.5 | 56.3 | green | −2.21/−9.15 | 9.76 | 5.52/2.28 | 48.0 |
| 14 | 49.5 | 43.6 | greenish blue | −13.53/−6.19 | 15.13 | 2.14/−7.11 | 32.3 |
| 15 | 52.7 | 45.0 | greenish blue greenish blue bluish green bluish green | −12.42/−5.58 | 10.83 | 0.56/−2.15 | 33.8 |

[Comparative Example 11]

1.11 g of the cerium nitrate stock solution, 0.732 g of the titanium oxide stock solution and 0.605 g of the silicon oxide stock solution, each prepared in Example 1, were weighed, to which 7.55 g of ethyl cellosolve was added, followed by mixing under agitation to prepare Coating Solution 11.

The thus prepared coating solution was spin coated onto a colorless, transparent glass substrate at 1000 rpm/10 seconds in the same manner as in Example 1. After drying in air, the coating was thermally treated at 250° C. for 2 hours to permit fine particles of gold to be deposited, followed by calcination at 720° C. for 120 seconds to obtain a color film-bearing glass substrate. The characteristics of the colored film are shown in Tables 4~5. The transmittance at 370 nm of the thus obtained colored film was 63.6%. Thus, the colored film had low UV absorption power and was, in fact, colorless and transparent. Thus, the truly colored film was not obtained.

[Comparative Example 21]

6.17 g of ethyl cellosolve was added to 2.5 g of the silica stock solution obtained in Example 1, to which 2.00 g of an ethyl cellosolve solution of 10 wt % of chloroauric acid tetrahydrate in which 3-aminopropyltriethoxysilane was contained in an equimolar amount relative to the chloroauric acid, followed by mixing under agitation to provide Coating Solution 12.

The thus prepared coating solution 12 was applied onto, dried in air and thermally treated in the same manner as in Comparative Example 1 to obtain a coated glass plate, with its characteristics shown in Tables 4~5. The resultant colored film assumed a pink color and had a transmittance at 370 nm of 74.5%, thus being low in UV absorption power.

[Comparative Example 3]

1.07 g of the silica stock solution and 1.73 g of titania stock solution, each obtained in Example 1, and 5.87 g of ethyl cellosolve were weighed, to which 1.33 g of an ethyl cellosolve of chloroauric acid tetrahydrate was added, followed by mixing under agitation, thereby prepare Coating Solution 13.

The thus prepared coating solution 13 was applied onto, dried in air and thermally treated in the same manner as in Comparative Example 1 to obtain a coated glass plate, with its characteristics shown in Tables 4~5. The resultant colored film assumed a purple color and had a transmittance at 370 nm of 61.7%, thus being low in UV absorption power.

[Comparative Example 4]

3.03 g of the titania stock solution obtained in Example 1 and 5.64 g of ethyl cellosolve were weighed, to which 1.33 g of an ethyl cellosolve solution of chloroauric acid tetrahydrate was finally added, followed by mixing under agitation to prepare Coating Solution 14.

The thus prepared coating solution 14 was applied onto, dried in air and thermally treated in the same manner as in Comparative Example 1 to obtain a coated glass plate, with its characteristics shown in Tables 4~5. The resultant colored film assumed a blue color and had a transmittance at 370 nm of 5.5%, thus being high in UV absorption power. However, the blue color did not change at all when the amount of the ethyl cellosolve solution of chloroauric acid tetrahydrate was changed.

[Comparative Example 5]

0.50 g of the silica stock solution and 2.42 g of the titania stock solution, each obtained in Example 1, and 5.75 g of ethyl cellosolve were weighed, to which 1.33 g of an ethyl cellosolve solution of chloroauric acid tetrahydrate was finally added, followed by mixing under agitation to prepare Coating Solution 15.

The thus prepared coating solution 15 was applied onto, dried in air and thermally treated in the same manner as in Comparative Example 1 to obtain a coated glass plate, with its characteristics shown in Tables 4~5. The resultant colored film assumed a blue color and had a transmittance at 370 nm of 58.6%, thus being low in UV absorption power.

TABLE 4

| Comparative Example | Film Composition (wt %) | | | | | | | Film Thickness (nm) | Refractive Index |
|---|---|---|---|---|---|---|---|---|---|
| | SiO$_2$ | TiO$_2$ | CeO$_2$ | Au | CoO | CrO | ZrO$_2$ | | |
| 1 | 24.1 | 24.0 | 51.9 | — | — | — | — | 110 | 1.9 |
| 2 | 84.0 | — | — | 16.0 | — | — | — | 180 | 1.5 |
| 3 | 36.1 | 47.9 | — | 16.0 | — | — | — | 110 | 1.8 |
| 4 | — | 84.0 | — | 16.0 | — | — | — | 100 | 2.2 |
| 5 | 16.8 | 67.2 | — | 16.0 | — | — | — | 80 | 2.0 |

TABLE 5

| Comp. Ex. | Ya (%) | Ta (%) | Transmitted light color | Chromaticity of transmitted light (a/b) | Visible light reflectance (glass surface side) (%) | Chromaticity of reflected light (glass surface side) (a/b) | 370 nm transmittance (%) |
|---|---|---|---|---|---|---|---|
| 1 | 81.4 | 77.4 | colorless, transparent | −0.55/ −1.34 | 19.5 | −1.81/ 3.71 | 63.6 |
| 2 | 73.6 | 78.1 | pink | 10.30/ −4.33 | 6.7 | 3.62/ −0.96 | 74.5 |
| 3 | 67.0 | 66.3 | purple | 2.88/ −14.69 | 11.3 | 4.69/ 5.09 | 61.7 |
| 4 | 54.8 | 57.7 | blue | −15.88/ −11.07 | 13.7 | 3.19/ 6.12 | 51.5 |
| 5 | 50.2 | 61.7 | blue | −11.01/ −17.27 | 13.4 | 0.66/ 8.49 | 58.6 |

Figure 2:
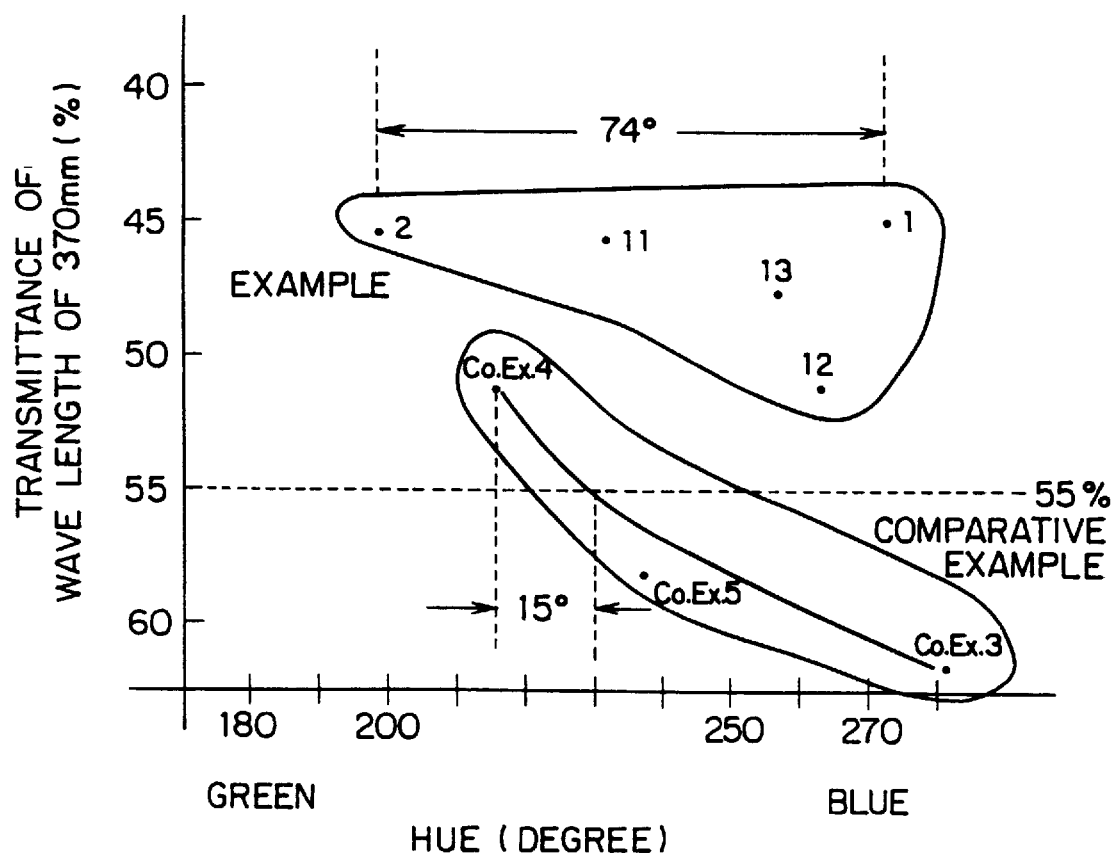
FIG. 2 is a graph showing the performances of examples of the invention and comparative examples.

The colors of the transmitted light in the foregoing examples and comparative examples are shown in FIG. 2 wherein the values of a and b of the Lab color system were plotted on rectangular coordinates. The examples and the comparative examples are illustrated by comparison.

When comparing Examples 1, 2, 11, 12, 13 with Comparative Examples 3, 4, 5, the single layer films (the substrate being colorless) which contain the fine articles of Au but are free of any cobalt oxide and the like are formed in all the cases, but with the following differences.

(1) As shown in FIG. 2, when the transmittance of the hue of transmitted light (when the position of a point where the values of a, b of the Lab color system are expressed by the rectangular coordinates is expressed by the angle of polar coordinates, a green color is indicated by 180 degrees and a blue color is indicated by 270 degrees) is plotted along the ordinate, the films of the examples have a UV transmittance of 55% or below, with their transmitted light hue being controllable within a wide range of 74 degrees. In contrast, the films obtained in the comparative examples exhibit a transmitted light hue which is controllable only within a narrow range of about 15 degrees in the range where the UV transmittance is 55% or below.

(2) The saturations of transmitted light obtained in the examples (i.e. the values of $(a^2+b^2)^{1/2}$ as expressed by the Lab color system) were, respectively, 10.1, 9.4, 10.3, 10.1 and 9.4 in Examples 1, 2, 11, 12, 13. Thus, they are at relatively low values of 9~10 and are dark in color. In contrast, the saturations of Comparative Examples 3, 4, 5 are, respectively, 15.0, 19.4 and 20.4 which are relatively high values ranging 15~20 and are thus bright in color.

With the glass of the invention covered with the single-layered film containing the fine particles of Au, a variety of hues can be developed on comparison with the case of prior art, and glass articles having a relatively small saturation can be obtained.

In Examples 3, 4 wherein a single-layered film (the substrate not colored) containing cobalt oxide or chromium oxide along with the fine particles of Au is formed, the saturations of transmitted light are, respectively, 4.6 and 7.0 and are thus lower and darker. The saturations of reflected light are, respectively, 1.3 and 1.8. Thus, the reflected light color of a very neutral tone with a saturation of not greater than 2 is obtained.

In Example 5, the UV absorption film containing the fine particles of Au and the intermediate layer containing silicon oxide and the fine particles of Au are both formed. The hue of transmitted light greatly differs from that of Example 1 wherein only the UV absorption film having the same composition is formed. This is ascribed to the combination of the color based on the fine particles of Au in the UV absorption film and the color of the fine particles of Au in the intermediate layer. While the saturation of transmitted light in Example 1 is about 10, the saturation of transmitted light is as high as about 16.

When comparing Example 6, wherein the UV absorption film containing the fine particles of Au and the intermediate layer containing silicon oxide and zirconium oxide are formed, with Example 2 wherein only the UV absorption film having the same composition as in Example 6 is formed, the color tones of reflected light differ from each other.

When comparing Example 8, wherein the UV absorption film containing the fine particles of Au and cobalt oxide and the intermediate layer containing silicon oxide and zirconium oxide are formed, with Example 3 wherein only the UV absorption film having the same composition as in Example 8 is formed, the hues of transmitted light are substantially at the same level (188° in both Examples 8 and 3) but the saturation is higher in Example 8 (9.7 in Example 8 and 4.6 in Example 3) with a smaller visible light reflectance. The color tones of reflected light differ from each other.

In Example 9 wherein the UV absorption film containing the fine particles of Au and chromium oxide and the intermediate layer containing silicon oxide and zirconium oxide are formed, the intermediate layer satisfies such non-reflective conditions as having set out hereinbefore. Eventually, the comparison with Example 4 using the UV absorption film having the same composition reveals that the visible light reflectance becomes very small.

The arrangement of Example 10 wherein the UV absorption film containing the fine particles of Au and another UV absorption film formed on the first-mentioned film and containing silicon oxide, titanium oxide and cerium oxide without containing any fine particles of Au is effectively utilized when only the UV absorption power is increased without changing the color tone of the UV absorption film containing the fine particles of Au.

With the case of Example 7 wherein the UV absorption film free of any fine particles of Au and the intermediate layer containing silicon oxide and the fine particles of Au are formed, the refractive index of the matrix of the fine particles of Au in the intermediate layer is so low that the hue of transmitted light is pink substantially as in Comparative Example 2. Nevertheless, the UV absorption power is higher than in Comparative Example 2.

On comparison with Example 7 wherein cerium oxide and cobalt oxide are not contained in the intermediate layer, Example 10 wherein the UV absorption film free of any fine particles of Au and the intermediate layer containing silicon oxide, cerium oxide, fine particles of Au and cobalt oxide are formed ensures very high UV absorption power.

In Example 14 wherein a single-layered film containing the fine particles of Au but not containing cobalt oxide (the substrate consisting of a green colored glass) is formed, the visible light transmittance is lower, and the heat ray interrupting performance and UV absorption power are higher than those of Example 2 which differs only in that the substrate is colorless. The color tones of transmitted light and reflected light change from those of Example 2.

In Example 15 wherein the UV absorption film containing the fine particles of Au and the intermediate layer containing silicon oxide and zirconium oxide are formed and wherein the substrate consists of a green colored glass, the visible light transmittance is lower, and the heat ray-interrupting performance and the UV absorption power are higher than those of Example 6 which differs only in that the substrate is colorless, with a slight variation in the hues of visible light.

[Examples 16~19]

The cerium nitrate stock solution, the titanium oxide stock solution and the silicon oxide stock solution, each prepared in Example 1, were, respectively, weighed in amounts indicated in Table 6, to which ethyl cellosolve was added, followed by final addition of the ethyl cellosolve solution of chloroauric acid tetrahydrate prepared in Example 1 and mixing under agitation to obtain Coating Solutions 16, 18 and 19.

TABLE 6

|  | Coating Solution | | |
|---|---|---|---|
|  | 16 | 18 | 19 |
| Cerium nitrate stock solution | 0.68 g | 0.68 g | 0.80 g |
| Titanium oxide stock solution | 0.64 g | 0.64 g | 0.76 g |
| Silicon oxide stock solution | 1.19 g | 1.19 g | 0.94 g |
| Ethyl cellosolve | 6.50 g | 6.16 g | 6.16 g |
| Ethyl cellosolve solution of chloroauric acid tetrahydrate | 1.00 g | 1.33 g | 1.33 g |

The respective coating solutions were each spin coated, at a frequency of 1000~2000 rpm/10 seconds, onto (a) a 3.91 mm thick green glass substrate having a size of 10 cm×10 cm (glass composition; $SiO_2$=70.4, $Al_2O_3$=1.5, total iron ($Fe_2O_3$=0.62 (wherein FeO=0.185)), $CeO_2$=1.67, $TiO_2$=0.14, CaO=8.0, MgO=4.0, $Na_2O$=13.0, and $K_2O$=0.70, each based on % by weight; refractive index=1.51; luminous transmittance, $Y_a$,=71.6%; sunlight transmittance, $T_g$,=44.7%; visible light reflectance, $R_g$,=6.6%; transmitted light color=green; transmitted light chromaticity expressed by the Lab color system, a=−8.0, b=3.4; and reflected light chromaticity, a=−1.9, b=−0.3), or onto (b) a 3.5 mm thick green glass substrate having a size of 10cm×10 cm (glass composition; same as that of the green glass substrate (a); luminous transmittance, $Y_a$,=73.5%; sunlight transmittance, $T_g$,=48.5%; visible light reflectance, $R_g$,=6.6%; transmitted light color=green; transmitted light chromaticity expressed by the Lab color system, a=−8.0, b=3.4; and reflected light chromaticity, a=−1.9, b=−0.3; main wavelength of transmitted light, $\lambda d$,=522 nm; excitation purity of transmitted light, $P_e$,=2.29%; and chromaticity of reflected light color=a=−1.9,b=−0.3). After drying in air, each coating was thermally treated at 250° C. for 2 hours to permit fine particles of gold to be deposited. Then, calcination was performed at 720° C. for 120 seconds to obtain a colored film-bearing glass plate. The colored film-bearing glass plates obtained by use of the coating solution 16 were those of Examples 16, 17, and the colored film-bearing glass plates obtained by use of the coating solutions 18, 19 were, respectively, those of Examples 18, 19. The visible light transmittance, sunlight transmittance, color (of transmitted light) and the UV transmittance at a wavelength of 370 nm of respective colored films are shown in Tables 7~9. These colored films exhibited good results with respect to the chemical resistance and the Taber abrasion resistance with a saturation of reflected light color ranging 0.8~5.5. Especially, there was obtained a reflected light color which was low in saturation and had a tone close to neutral gray. The reflection characteristics were those values which were determined by passing light from the glass surface side of the glass substrate.

TABLE 7

| | | Film Composition (wt %) | | | | | | |
|---|---|---|---|---|---|---|---|---|
| Example | Film | $SiO_2$ | $TiO_2$ | $CeO_2$ | Au | CoO | CrO | $ZrO_2$ |
| 16 | UV absorption film | 41.6 | 18.4 | 27.5 | 12.5 | — | — | — |
| 17 | UV absorption film | 41.6 | 18.4 | 27.5 | 12.5 | — | — | — |
| 18 | UV absorption film | 31.7 | 21.0 | 31.3 | 16.0 | — | — | — |
| 19 | UV absorption film | 39.9 | 17.7 | 26.4 | 16.0 | — | — | — |

TABLE 8

| | Glass Substrate | UV absorption Film | |
|---|---|---|---|
| Example | (nm) | Thickness(nm) | Refractive Index |
| 16 | (a) | 72 | 1.70 |
| 17 | (a) | 48 | 1.70 |
| 18 | (b) | 68 | 1.76 |
| 19 | (b) | 73 | 1.70 |

TABLE 9

| Example | Ya (%) | Tg (%) | Tuv (%) | T370 (%) | Chromaticity of Transmitted Light (a/b) | Visible Light Reflectance (glass surface side) (%) | Chromaticity of Reflected Light (a/b) (glass surface side) |
|---|---|---|---|---|---|---|---|
| 16 | 55.9 | 40.0 | 6.3 | 18.0 | −3.8/−2.1 | 10.7 | −1.2/2.7 |
| 17 | 58.9 | 41.3 | 6.3 | 18.2 | −4.9/0.2 | 10.0 | −0.4/−0.7 |
| 18 | 46.6 | 36.6 | 5.7 | — | −6.4/−4.4 | 15.4 | 4.9/2.3 |
| 19 | 50.2 | 38.5 | 6.0 | — | −4.4/−3.3 | 12.6 | 4.5/3.2 |

[Example 20]

Preparation of a Pd starting material 2 moles of acetylacetone was added to 1 mole of palladium chloride and thermally treated for several hours by heating to 90° C. under agitation. The resultant precipitate was removed by filtration and the solid content in the filtrate was measured to confirm the content of Pd. The filtrate was used as a palladium stock solution.

0.58 g of a silicon oxide stock solution, 0.93 g of a titanium oxide stock solution and 0.9 g of a cerium oxide stock solution were, respectively, weighed, to which 5.85 g of ethyl cellosolve was added, followed by further addition of 1.5 g of an ethyl cellosolve solution of 10 wt % of chloroauric acid and final addition of 1.5 g of the Pd stock solution to obtain a coating solution.

The thus obtained coating solution was spin coated, at 2000 rpm/10 seconds, onto a 3.53 mm thick green glass substrate having a size of 10 cm×10 cm (glass composition; same as that of the green glass substrate of Example 17; luminous transmittance, Ya,=73.5%; sunlight transmittance, Tg,=48.5%; visible light reflectance, Rg,=7.0%; transmitted light color=green; transmitted light chromaticity expressed by the Lab color system, a=−7.2, b=3.0; and reflected light chromaticity, a=−2.4, b=−0.1). After drying in air, the coating was thermally treated at 250° C. for 2 hours to permit fine particles of gold to be deposited. Thereafter, calcination was performed at 720° C. for 120 seconds to obtain a colored film-bearing glass plate. The optical characteristics such as the visible light transmittance (Ya), sunlight transmittance (Tg), color (of transmitted light), and UV transmittance (Tuv) and the film composition are shown in Tables 10~12. The colored film exhibited good results with respect to the chemical resistance and the Taber abrasion resistance. The reflection characteristics are those values measured by passing light from the covered surface side of the glass substrate.

TABLE 10

| Example | Film Composition (wt %) | | | | | Refractive Index | Film Thickness (nm) |
|---|---|---|---|---|---|---|---|
| | SiO₂ | TiO₂ | CeO₂ | Au | Pd | | |
| 20 | 20.0 | 26.5 | 39.6 | 12.5 | 1.4 | 1.87 | 50 |

TABLE 11

| Example | Ya (%) | Tg (%) | Tuv (%) | Chromaticity and Lightness of Transmitted Light (a/b/L) | Visible Light Reflectance Glass Surface Side (%) |
|---|---|---|---|---|---|
| 20 | 57.1 | 40.6 | 5.9 | −6.2/3.8/76.1 | 13.2 |

TABLE 12

| Example | Chromaticity of Reflected Light (Glass Surface Side) (a/b) | Visible Light Reflectance at (Film Surface Side) (%) | Chromaticity and Lightness of Reflected Light (Film Surface Side) |
|---|---|---|---|
| 20 | −3.9/2.1 | 17.3 | −0.4/−3.7 |

[Examples 21~51]

Two types of green glass substrates A, B having a size of 10 cm×10 cm and such a glass composition (wt %), thickness, and optical characteristics as shown in Table 13 were provided as a glass substrate.

TABLE 13

| | A | B |
|---|---|---|
| SiO₂ | 71.0 | 70.4 |
| Al₂O₃ | 1.53 | 1.5 |
| Fe₂O₃ | 0.52 | 0.62 |
| (FeO content in Fe₂O₃) | — | 0.185 |
| CeO₂ | 0 | 1.67 |
| TiO₂ | 0 | 0.14 |
| CaO | 8.62 | 8.0 |
| MgO | 4.06 | 4.0 |
| Na₂O | 12.3 | 13.0 |
| K₂O | 0.76 | 0.70 |
| Refractive Index | 1.51 | 1.51 |
| Thickness (mm) | 4.9 | 3.5 |
| Ya (%) | 76.0 | 73.5 |
| Tg (%) | 51.6 | 48.5 |
| T370 (%) | 53.1 | — |
| Tuv (%) | 24.3 | 9.7 |
| Visible light Reflectance Rg (%) | 6.9 | 6.6 |
| Transmitted Light Color | green | green |
| Transmitted Light: | | |
| Chromaticity a | −6.5 | −8.0 |
| b | 0.5 | 3.4 |
| Dominant Wavelength λd (nm) | 500 | 522 |
| Excitation Purity Pe (%) | 2.49 | 2.29 |
| Chromaticity of Reflected Light: | | |
| a | −1.7 | −1.9 |
| b | −0.7 | −0.3 |

The cerium nitrate stock solution, the titanium oxide stock solution and the silicon oxide stock solution, each prepared in Example 1 were so weighed that film compositions indicated in Tables 14, 15 were obtained. Ethyl cellosolve was added to the respective mixtures, followed by final addition of the ethyl cellosolve solution of chloroauric acid tetrahydrate prepared in Example 1 and mixing under agitation to provide six coating solutions. Each solution was spin coated onto the glass substrates A, B at a frequency of 1000~2000 rpm, followed by drying in air and thermal treatment to obtain glass plates. The characteristics of the thus obtained glass plates are shown in Tables 16~19. The colored films exhibited good results with respect to the chemical resistance and the Taber abrasion resistance. The reflected light colors were neutral in tone.

TABLE 14

| Example | Upper Layer | | | | | | Lower Layer | | | | | |
|---|---|---|---|---|---|---|---|---|---|---|---|---|
| | Film Composition (wt %) | | | | Refractive Index | Film Thickness (nm) | Film Composition (wt %) | | | | Refractive Index | Film Thickness (nm) |
| | $SiO_2$ | $TiO_2$ | $CeO_2$ | Au | | | $SiO_2$ | $TiO_2$ | $CeO_2$ | Au | | |
| 21 | 23.2 | 30.8 | 46.0 | 0 | 1.87 | 127 | 89.0 | 0 | 0 | 11.0 | 1.46 | 108 |
| 22 | " | " | " | " | " | 104 | " | " | " | " | " | 108 |
| 23 | " | " | " | " | " | 83 | " | " | " | " | " | 108 |
| 24 | " | " | " | " | " | 104 | " | " | " | " | " | 90 |
| 25 | 7.3 | 32.4 | 48.3 | 12.0 | 2.02 | 123 | 41.9 | 18.5 | 27.6 | 12.0 | 1.70 | 121 |
| 26 | " | " | " | " | " | 123 | " | " | " | " | " | 99 |
| 27 | " | " | " | " | " | 123 | " | " | " | " | " | 79 |
| 28 | 8.3 | 36.8 | 54.9 | 0 | 2.02 | 113 | 41.9 | 18.5 | 27.6 | 12.0 | 1.70 | 121 |
| 29 | " | " | " | " | " | 113 | " | " | " | " | " | 99 |
| 30 | " | " | " | " | " | 113 | " | " | " | " | " | 79 |
| 31 | 7.3 | 32.4 | 48.3 | 12.0 | 2.02 | 123 | 47.5 | 21.1 | 31.4 | 12.0 | 1.70 | 121 |
| 32 | " | " | " | " | " | 123 | " | " | " | " | " | 99 |
| 33 | " | " | " | " | " | 123 | " | " | " | " | " | 79 |
| 34 | 89.0 | 0 | 0 | 11.0 | 1.46 | 108 | 23.2 | 30.8 | 46.0 | 0 | 1.87 | 127 |
| 35 | 7.3 | 36.8 | 54.9 | 0 | 2.02 | 82 | 89.0 | 0 | 0 | 11.0 | 1.46 | 108 |
| 36 | " | " | " | " | " | 56 | " | " | " | " | " | 108 |
| 37 | " | " | " | " | " | 45 | " | " | " | " | " | 108 |
| 38 | " | " | " | " | " | 82 | " | " | " | " | " | 97 |
| 39 | " | " | " | " | " | 56 | " | " | " | " | " | 97 |
| 40 | " | " | " | " | " | 45 | " | " | " | " | " | 97 |

TABLE 15

| Example | Upper Layer | | | | | | Lower Layer | | | | | |
|---|---|---|---|---|---|---|---|---|---|---|---|---|
| | Film Composition (wt %) | | | | Refractive Index | Film Thickness (nm) | Film Composition (wt %) | | | | Refractive Index | Film Thickness (nm) |
| | $SiO_2$ | $TiO_2$ | $CeO_2$ | Au | | | $SiO_2$ | $TiO_2$ | $CeO_2$ | Au | | |
| 41 | 41.9 | 18.5 | 27.6 | 12.0 | 1.70 | 121 | 8.3 | 36.8 | 54.9 | 0 | 2.02 | 113 |
| 42 | " | " | " | " | " | 121 | " | " | " | " | " | 92 |
| 43 | " | " | " | " | " | 121 | " | " | " | " | " | 75 |
| 44 | 41.9 | 18.5 | 27.6 | 12.0 | 1.70 | 121 | 7.3 | 32.4 | 48.3 | 12.0 | 2.02 | 123 |
| 45 | " | " | " | " | " | 99 | " | " | " | " | " | 123 |
| 46 | " | " | " | " | " | 79 | " | " | " | " | " | 123 |
| 47 | 41.9 | 18.5 | 27.6 | 12.0 | 1.70 | 99 | 8.3 | 36.8 | 54.9 | 0 | 2.02 | 113 |
| 48 | " | " | " | " | " | 79 | " | " | " | " | " | 113 |
| 49 | 47.5 | 21.1 | 31.4 | 0 | 1.70 | 121 | 7.3 | 32.4 | 48.3 | 12.0 | 2.02 | 123 |
| 50 | " | " | " | " | " | 99 | " | " | " | " | " | 123 |
| 51 | " | " | " | " | " | 79 | " | " | " | " | " | 123 |

TABLE 16

| Example | Glass Substrate | Ya (%) | Tg (%) | Tuv (%) | T370 (%) | Chromaticity and Lightness of Transmitted Light (a/b/L) |
|---|---|---|---|---|---|---|
| 21 | A | 69.7 | 46.0 | 10.8 | 26.1 | −5.9/4.4/83.9 |
| 22 | do. | 64.9 | 45.2 | 12.0 | 29.3 | −2.6/−3.9/81.2 |
| 23 | do. | 62.6 | 44.6 | 13.6 | 33.0 | −1.1/−4.6/79.7 |
| 24 | do. | 65.4 | 45.6 | 12.8 | 31.1 | −2.9/−4.2/81.6 |
| 25 | B | 34.3 | 30.3 | 2.3 | 6.0 | −8.3/−7.0/60.1 |
| 26 | do. | 38.6 | 31.7 | 2.6 | 7.1 | −13.5/−3.5/64.1 |
| 27 | do. | 39.9 | 32.4 | 2.7 | 7.3 | −13.7/−4.7/65.3 |
| 28 | do. | 48.4 | 38.3 | 2.8 | 7.4 | −2.4/−1.4/70.0 |
| 29 | do. | 52.3 | 39.9 | 3.1 | 8.2 | −5.7/0.21/73.1 |
| 30 | do. | 54.5 | 40.8 | 3.1 | 8.3 | −6.3/−0.8/74.7 |
| 31 | do. | 48.2 | 35.2 | 3.1 | 8.4 | −20.7/1.01/71.9 |
| 32 | do. | 47.5 | 35.4 | 3.4 | 9.3 | −20.5/−0.7/71.5 |
| 33 | do. | 47.0 | 35.8 | 3.3 | 8.9 | −19.0/−2.5/71.1 |
| 34 | A | 75.0 | 50.0 | 11.7 | 28.4 | −7.8/1.9/87.4 |
| 35 | do. | 57.2 | 42.0 | 31.4 | 12.9 | 0.8/−3.4/75.8 |
| 36 | do. | 57.3 | 41.8 | 31.5 | 13.1 | 0.1/1.2/75.6 |
| 37 | do. | 58.6 | 42.6 | 31.3 | 13.2 | −0.8/2.6/76.5 |
| 38 | do. | 58.0 | 42.2 | 31.6 | 13.0 | −0.1/−2.7/76.4 |
| 39 | do. | 58.4 | 42.2 | 31.9 | 13.3 | −0.9/2.3/76.4 |
| 40 | do. | 60.2 | 43.2 | 31.1 | 13.1 | −1.7/4.4/77.4 |

TABLE 17

| Example | Glass Substrate | Ya (%) | Tg (%) | Tuv (%) | T370 (%) | Chromaticity and Lightness of Transmitted Light (a/b/L) |
|---|---|---|---|---|---|---|
| 41 | A | 46.4 | 39.2 | 5.3 | 13.5 | -0.2/-6.6/68.7 |
| 42 | do. | 44.0 | 39.2 | 6.8 | 17.2 | 1.1/-12.2/67.2 |
| 43 | do. | 43.2 | 39.4 | 7.4 | 18.6 | 3.3/-14.0/66.5 |
| 44 | do. | 29.9 | 30.0 | 3.9 | 10.0 | -11.5/-14.1/57.2 |
| 45 | do. | 32.9 | 30.9 | 4.7 | 11.8 | -16.3/-8.6/60.1 |
| 46 | do. | 35.0 | 31.9 | 5.0 | 12.6 | -19.4/-7.9/62.2 |
| 47 | do. | 50.0 | 40.9 | 6.3 | 16.1 | -4.0/-4.4/71.6 |
| 48 | do. | 52.0 | 41.9 | 6.1 | 15.5 | -4.0/-5.5/73.1 |
| 49 | do. | 49.3 | 36.3 | 5.6 | 14.2 | -22.3/-1.7/73.1 |
| 50 | do. | 48.3 | 36.6 | 6.1 | 15.6 | -24.4/-1.3/72.6 |
| 51 | do. | 48.0 | 37.0 | 5.9 | 14.8 | -23.0/-4.5/72.5 |

TABLE 18

| Example | Visible Light Reflectance (Glass Surface) (%) | Chromaticity of Reflected Light Side (Glass Surface Side) (a/b) | Visible Light Reflectance at (Film Surface Side) (%) | Chromaticity of Reflected Light (Film Surface Side) (a/b) |
|---|---|---|---|---|
| 21 | 7.0 | 4.6/-10.8 | 6.7 | 14.6/-19.0 |
| 22 | 9.5 | 3.0/5.3 | 13.0 | 0.2/11.8 |
| 23 | 11.3 | 0.9/6.4 | 16.1 | -4.1/12.4 |
| 24 | 9.7 | 2.8/6.0 | 13.5 | -1.0/12.8 |
| 25 | 5.4 | 5.8/-12.1 | 7.1 | 13.0/-21.0 |
| 26 | 7.6 | 7.3/-5.6 | 7.9 | 20.5/-20.8 |
| 27 | 8.2 | 3.5/-1.1 | 13.0 | 16.2/-3.1 |
| 28 | 6.9 | 8.9/-8.7 | 9.0 | 18.6/-16.6 |
| 29 | 8.9 | 5.6/-1.9 | 10.3 | 19.5/-9.0 |
| 30 | 9.7 | 0.5/1.9 | 12.4 | 12.5/0.3 |
| 31 | 7.4 | 6.0/-10.9 | 6.0 | 6.0/-29.8 |
| 32 | 8.4 | 5.2/-6.6 | 6.9 | 7.3/-23.2 |
| 33 | 9.0 | 0.5/-2.1 | 7.6 | 1.2/-15.2 |
| 34 | 4.6 | 0.2/0.4 | 6.1 | 2.1/-3.2 |
| 35 | 15.6 | -0.6/3.9 | 24.5 | -6.3/7.1 |
| 36 | 16.0 | -0.9/-1.3 | 24.4 | -4.4/-2.4 |
| 37 | 15.4 | -1.1/-3.4 | 22.7 | -3.4/-5.7 |
| 38 | 16.2 | -2.2/4.8 | 24.4 | -6.2/6.5 |
| 39 | 16.7 | -2.6/-1.3 | 24.1 | -4.0/-3.1 |
| 40 | 15.6 | -2.9/-4.1 | 21.8 | -2.2/-8.4 |

TABLE 19

| Example | Visible Light Reflectance (Glass Surface Side) (%) | Chromaticity of Reflected Light (Glass Surface Side) (a/b) | Visible Light Reflectance (Film Surface Side) (%) | Chromaticity of Reflected Light (Film Surface Side) (a/b) |
|---|---|---|---|---|
| 41 | 6.4 | 9.2/-9.4 | 8.0 | 12.7/-12.1 |
| 42 | 10.0 | 2.3/7.0 | 12.2 | 8.2/7.9 |
| 43 | 11.6 | -2.7/11.0 | 13.7 | 2.0/14.0 |
| 44 | 6.1 | 4.0/-7.4 | 6.2 | -4.5/-8.6 |
| 45 | 7.5 | 9.5/-9.6 | 6.7 | 14.8/-23.0 |
| 46 | 7.5 | 7.9/-7.7 | 8.6 | 21.1/-13.4 |
| 47 | 10.3 | 7.4/-0.5 | 10.5 | 16.2/-7.8 |
| 48 | 12.2 | 2.1/6.1 | 11.6 | 9.2/2.0 |
| 49 | 8.3 | 7.9/-8.9 | 7.6 | 7.3/-17.4 |
| 50 | 8.3 | 7.9/-8.5 | 8.7 | 16.9/-19.9 |
| 51 | 8.1 | -0.3/0.2 | 10.5 | 9.4/-3.0 |

INDUSTRIAL FIELD OF UTILITY

The invention contemplates to provide glass articles covered with a UV absorbing, colored film and, more particularly, glass plates covered with a UV absorbing, colored film which is adapted for use as windows for vehicles such as automobiles or for buildings.

What is claimed is:

1. A UV absorbing, colored film-covered glass article which comprises a glass substrate covered on the surface thereof with a UV absorbing, colored film which comprises, as main components expressed by wt %:
   silicon oxide 5~50;
   titanium oxide 5~70;
   cerium oxide 20~80;
   coloring fine particles of at least one member selected from the group consisting of gold, silver, platinum, palladium, cadmium sulfide and cadmium selenide 5~30; and
   at least one coloring metal oxide selected from the group consisting of cobalt oxide, chromium oxide, copper oxide, manganese oxide, nickel oxide and iron oxide 0~30.

2. A UV absorbing, colored film-covered glass article according to claim 1, further comprising an intermediate layer formed between said UV absorbing, colored film and said glass substrate or an uppermost layer formed on said UV absorbing, colored film, said intermediate layer or said uppermost layer having a refractive index lower than that of said UV absorbing, colored film and comprising, based on wt %:
   silicon oxide 20~100;
   at least one metal oxide selected from the group consisting of titanium oxide, zirconium oxide, cerium oxide, zinc oxide and tantalum oxide 0~70; and
   coloring fine particles of at least one member selected from the group consisting of gold, silver, platinum, palladium, cadmium sulfide and cadmium selenide 0~30.

3. The colored film-covered glass articles according to claim 1 wherein said glass substrate has a thickens of 1.5~5.5 mm, a chromaticity of transmitted light defined by a value of a of -10.0~-2.0 and a value of b of -4.0~4.0 when expressed by the Lab color system, a UV transmittance of 10~70% (at a wavelength of 370 nm), a visible light transmittance of 40~85%, and a sunlight transmittance of 20~80%.

4. The colored film-covered glass articles according to claim 3, wherein said glass substrate has a chromaticity of transmitted light defined by a value of a of -10.0~-4.0 and a value of b of -1.0~4.0 when expressed by the Lab color system.

5. The colored film-covered glass articles according to claim 3, wherein said glass substrate has a UV transmittance (Tuv) of 15% or below.

6. A UV absorbing, colored film-covered glass article according to claim 1 wherein the transmitted light of said glass articles has a color tone within a region defined a sector which is formed by connecting point O (a=0, b=0), point A' (a=25, b=0), point B' (a=0, b=-25), point C' (a=O, b=25) and point O' of the Lab color system in this order in such a way that points O' and A' and points C' and O' are, respectively, connected linearly, and points A' and B' and points B' and C' are connected arcuately about point O'.

7. The colored film-covered glass article according to claim 1 wherein the transmitted light of said glass article has transmitted color which has a color tone within ranges of a of -5.0~5.0 and b of -5.0~5.0 and a lightness of L of 60~90 when expressed by the Lab color system.

8. A UV absorbing, colored film-covered glass article according to claim 1 wherein the reflected light from a glass surface side of said glass article has a value of $(a^2+b^2)^{1/2}$ of 10 or below when calculated from the values of a and b of the Lab color system.

9. A UV absorbing, colored film-covered glass article according to claim 8, wherein the reflected light from a glass surface side of said glass article has a value of $(a^2+b^2)^{1/2}$ of 5.0 or below when calculated from the values of a and b of the Lab color system.

10. The colored film-covered glass articles according to claim 1 wherein said glass article has a sunlight transmittance of 55% or below.

11. The colored film-covered glass articles according to claim 1 wherein said glass article has a UV transmittance (Tuv) of 12% or below.

12. A UV absorbing, colored film-covered glass article which comprises:

a glass substrate;

a UV absorbing film covering a surface of said glass substrate therewith, said UV absorbing film comprising, as main components expressed by wt %, silicon oxide 5~50, titanium oxide 5~70, and cerium oxide 20~80; and an intermediate layer formed between said UV absorbing film and said glass substrate or an uppermost layer formed on said UV absorbing film, said intermediate layer or said uppermost layer having a refractive index lower than that of said UV absorbing film and comprising, based on wt %, coloring fine particles of at least one member selected from the group consisting of gold, silver, platinum, palladium, cadmium sulfide and cadmium selenide 5~30, silicon oxide 5~95, at least one metal oxide selected from the group consisting of titanium oxide, zirconium oxide, cerium oxide, zinc oxide and tantalum oxide 0~70, and at least one coloring metal oxide selected from the group consisting of cobalt oxide, chromium oxide, copper oxide, manganese oxide, nickel oxide and iron oxide 0~30.

13. A UV absorbing, colored film-covered glass article which comprises a glass substrate having a thickness of 1.5[5.5 mm, a chromaticity of transmitted light defined by a value of a of −10.0~−4.0 and a value of b of −1.0~4.0 when expressed by the Lab color system, a UV transmittance (at a wavelength of 370 nm) of 10~70%, a visible light transmittance of 40~85%, and a sunlight transmittance of 20~80% and UV absorbing, colored film on the surface thereof, said UV absorbing, colored film which comprises, as main components expressed by wt %, silicon oxide 30~50, titanium oxide 5~45, cerium oxide 20~60, provided that the total of titanium oxide and cerium oxide is 35~55, and coloring fine particles of gold 5~30, and which has a refractive index of 1.65~1.76.

* * * * *

UNITED STATES PATENT AND TRADEMARK OFFICE
CERTIFICATE OF CORRECTION

PATENT NO. : 5,876,854
DATED : March 2, 1999
INVENTOR(S) : Kawazu et al.

It is certified that error appears in the above-identified patent and that said Letters Patent is hereby corrected as shown below:

Col. 3, line 12, delete "as"; and
      line 64, delete "has" insert --have--.

Col. 6, line 56, delete "18" and inset a hyphen -- - --.

Col. 7, line 63, "n>2" should read --n≥2--.

Col. 13, line 56, "delete "placed" insert --place--.

Col. 16, line 14, delete "ad" insert --film had--; and
      line 15, delete "on" insert --abrasion--.

Col. 17, line 25, "Example 11" should read --Example 1--;
      line 45, "Example 21" should read --Example 2--.

UNITED STATES PATENT AND TRADEMARK OFFICE
CERTIFICATE OF CORRECTION

PATENT NO. : 5,876,854
DATED : March 2, 1999
INVENTOR(S) : KAWAZU et al

Page 2 of 2

It is certified that error appears in the above-indentified patent and that said Letters Patent is hereby corrected as shown below:

Col. 28, line 37, delete "thickens" insert --thickness--;
        line 54, delete "defined" insert --defining--.

Col. 30, line 15, "1.5[5.5" should read -- 1.5 ~ 5.5--.

Signed and Sealed this

First Day of August, 2000

Attest:

Q. TODD DICKINSON

*Attesting Officer*   *Director of Patents and Trademarks*